(12) United States Patent
Segal et al.

(10) Patent No.: US 11,301,313 B2
(45) Date of Patent: *Apr. 12, 2022

(54) COLLABORATIVE APPLICATION TESTING

(71) Applicant: International Business Machines Corporation, Armonk, NY (US)

(72) Inventors: Ory Segal, Tel Aviv (IL); Roi Saltzman, Rishon Le Zion (IL); Omer Tripp, Har-Adar (IL)

(73) Assignee: International Business Machines Corporation, Armonk, NY (US)

( * ) Notice: Subject to any disclaimer, the term of this patent is extended or adjusted under 35 U.S.C. 154(b) by 300 days.

This patent is subject to a terminal disclaimer.

(21) Appl. No.: 16/553,317

(22) Filed: Aug. 28, 2019

(65) Prior Publication Data
US 2019/0384665 A1 Dec. 19, 2019

Related U.S. Application Data

(63) Continuation of application No. 14/046,022, filed on Oct. 4, 2013, now Pat. No. 10,474,558, which is a continuation of application No. 13/670,826, filed on Nov. 7, 2012, now Pat. No. 10,521,288.

(51) Int. Cl.
*G06F 11/00* (2006.01)
*G06F 11/07* (2006.01)
*G06F 11/36* (2006.01)
*G06F 21/57* (2013.01)

(52) U.S. Cl.
CPC ...... *G06F 11/0784* (2013.01); *G06F 11/3668* (2013.01); *G06F 11/3676* (2013.01); *G06F 21/577* (2013.01); *G06F 11/3604* (2013.01)

(58) Field of Classification Search
CPC ............ G06F 11/3676; G06F 11/3604; G06F 11/0784; G06F 11/3668; G06F 21/577
See application file for complete search history.

(56) References Cited

U.S. PATENT DOCUMENTS

| | | |
|---|---|---|
| 8,228,328 B1 | 7/2012 | French |
| 8,370,286 B2 | 2/2013 | Van Zwol |
| 8,528,095 B2 * | 9/2013 | Haviv ................. G06F 11/3604 726/25 |
| 8,635,560 B2 | 1/2014 | Drader |

(Continued)

OTHER PUBLICATIONS

Agilent, "Agilent N2X Packet Application Software, E7880B Technical Data Sheet," published online in 2003, at www.electronicsdatasheets.com/download/109033.pdf?format=pdf(Year: 2003) 16 pages.

(Continued)

*Primary Examiner* — Cesar B Paula
*Assistant Examiner* — David Faber
(74) *Attorney, Agent, or Firm* — Aaron N. Pontikos

(57) ABSTRACT

A method, computer program product, and computer system for performing, at a computing device, an analysis of a web application. A response is annotated by the web application with coverage data based upon, at least in part, the analysis, wherein the coverage data indicates which actions have been performed on the web application and which actions have not been performed on the web application according to results of the analysis. The response that includes the coverage data is shared with one or more users.

20 Claims, 6 Drawing Sheets

(56) References Cited

U.S. PATENT DOCUMENTS

| | | | |
|---|---|---|---|
| 8,819,637 B2* | 8/2014 | Abadi | G06F 21/125 |
| | | | 717/126 |
| 10,474,558 B2 | 11/2019 | Segal | |
| 10,521,288 B2 | 12/2019 | Segal | |
| 2003/0188301 A1 | 10/2003 | Bates | |
| 2003/0229900 A1 | 12/2003 | Reisman | |
| 2005/0166094 A1 | 7/2005 | Blackwell | |
| 2006/0234639 A1* | 10/2006 | Kushwaha | H04W 24/08 |
| | | | 455/67.11 |
| 2006/0282897 A1* | 12/2006 | Sima | G06F 11/3664 |
| | | | 726/25 |
| 2007/0288247 A1 | 12/2007 | Mackay | |
| 2008/0184208 A1 | 7/2008 | Sreedhar | |
| 2008/0234967 A1* | 9/2008 | Vandewiele | G01R 31/31835 |
| | | | 702/119 |
| 2008/0235633 A1 | 9/2008 | Ghiloni et al. | |
| 2008/0244536 A1* | 10/2008 | Farchi | G06F 8/433 |
| | | | 717/130 |
| 2010/0042959 A1 | 2/2010 | Bhinge | |
| 2010/0083240 A1* | 4/2010 | Siman | G06F 16/245 |
| | | | 717/144 |
| 2011/0088014 A1 | 4/2011 | Becker | |
| 2011/0107153 A1 | 5/2011 | Shafer | |
| 2011/0191855 A1 | 8/2011 | De Keukelaere | |
| 2011/0197122 A1* | 8/2011 | Chan | G06F 40/143 |
| | | | 715/234 |
| 2011/0265020 A1* | 10/2011 | Fields | G06F 11/3668 |
| | | | 715/760 |
| 2011/0321016 A1* | 12/2011 | Haviv | G06F 8/75 |
| | | | 717/128 |
| 2012/0192280 A1* | 7/2012 | Venkatakrishnan | |
| | | | G06F 21/6227 |
| | | | 726/25 |
| 2012/0198557 A1* | 8/2012 | Pistoia | G06F 21/577 |
| | | | 726/25 |
| 2013/0160130 A1* | 6/2013 | Mendelev | G06F 21/56 |
| | | | 726/25 |
| 2013/0191920 A1* | 7/2013 | Amit | H04L 63/166 |
| | | | 726/25 |
| 2013/0205398 A1* | 8/2013 | Kalman | G06F 21/10 |
| | | | 726/25 |
| 2014/0109227 A1* | 4/2014 | Kalman | G06F 21/577 |
| | | | 726/25 |
| 2014/0201842 A1* | 7/2014 | Tripp | G06F 21/56 |
| | | | 726/25 |
| 2014/0258894 A1* | 9/2014 | Brown | G06F 8/71 |
| | | | 715/762 |
| 2014/0331327 A1* | 11/2014 | Maor | C07K 14/47 |
| | | | 726/25 |

OTHER PUBLICATIONS

Chalmers et al., "A Lattice-Based Approach to Mashup Security," Conferecne Pager ASIACCS '10 Apr. 13-16, 2010, Beijing China, Copyright 2010 ACM 978-1-60558-936-7 9 pages.

* cited by examiner

Response 17

| HTML | Coverage Data 1 |

Response 19

| HTML | Coverage Data 1 | Coverage Data 2 | Coverage Data n |

FIG. 5

COLLABORATIVE APPLICATION TESTING

The subject application is a continuation of U.S. patent application Ser. No. 14/046,022, filed on Oct. 4, 2013, which is a continuation application of U.S. patent application Ser. No. 13/670,826, filed on Nov. 7, 2012, the entire content of which is herein incorporated by reference.

TECHNICAL FIELD

This disclosure relates to application testing and, more particularly, to collaborative application testing.

BACKGROUND

Some applications, such as web applications, may be subjected to attacks by, e.g., hackers. For instance, injection attacks may be used to attack web applications. An example of an injection attack may include cross-site scripting (XSS)—a vulnerability that may allow attackers to bypass a client-side security mechanism and gain elevated access-privileges to sensitive information. Security scanners, such as a dynamic, automated web application security scanner, may be used to identify XSS vulnerabilities, as well as other injection vulnerabilities (e.g., command injection).

Testing may be conducted by a large group of testers (or teams of testers), often located in different geographical locations and/or time zones. When multiple testers are involved in testing vulnerabilities of a web application, at least some degree, if not a great deal, of redundancy may occur as a result of overlap between test run on the same web application by different testers. For example, the coverage data may not always be visible to the testers. As a general example, it may be difficult for other testers in the group to quantify the degree to which payloads that some testers may have attempted thus far, that cover the attack surface for the web application that the group may be testing. In the example, efficiently continuing the testing process between the testers may be impeded.

SUMMARY OF DISCLOSURE

In one implementation, a method, performed by one or more computing devices, comprises performing, at a computing device, an analysis of a web application. A response is annotated by the web application with coverage data based upon, at least in part, results of the analysis, wherein the coverage data indicates which actions have been performed on the web application and which actions have not been performed on the web application. The response that includes the coverage data is shared with one or more users.

One or more of the following features may be included. The response may include a Hypertext Markup Language response. The analysis may include static analysis. The response that may include the coverage data may be shared with a user that did not initiate the analysis. The response that may include the coverage data may be shared automatically based upon, at least in part, completing at least a portion of the analysis of the web application. The coverage data may be stored at the computing device. A second analysis of the web application may be performed. A second response may be annotated by the web application with additional coverage data based upon, at least in part, results of the second analysis. The second response may be shared with one or more users, wherein the second response may include the coverage data and the additional coverage data.

In another implementation, a computer program product resides on a computer readable storage medium that has a plurality of instructions stored on it. When executed by a processor, the instructions cause the processor to perform operations comprising performing an analysis of a web application. A response is annotated by the web application with coverage data based upon, at least in part, results of the analysis, wherein the coverage data indicates which actions have been performed on the web application and which actions have not been performed on the web application. The response that includes the coverage data is shared with one or more users.

One or more of the following features may be included. The response may include a Hypertext Markup Language response. The analysis may include static analysis. The response that may include the coverage data may be shared with a user that did not initiate the analysis. The response that may include the coverage data may be shared automatically based upon, at least in part, completing at least a portion of the analysis of the web application. The coverage data may be stored at a computing device associated with the analysis. A second analysis of the web application may be performed. A second response may be annotated by the web application with additional coverage data based upon, at least in part, results of the second analysis. The second response may be shared with one or more users, wherein the second response may include the coverage data and the additional coverage data.

In another implementation, a computing system includes a processor and a memory configured to perform operations comprising performing an analysis of a web application. A response is annotated by the web application with coverage data based upon, at least in part, results of the analysis, wherein the coverage data indicates which actions have been performed on the web application and which actions have not been performed on the web application. The response that includes the coverage data is shared with one or more users.

One or more of the following features may be included. The response may include a Hypertext Markup Language response. The analysis may include static analysis. The response that may include the coverage data may be shared with a user that did not initiate the analysis. The response that may include the coverage data may be shared automatically based upon, at least in part, completing at least a portion of the analysis of the web application. The coverage data may be stored at a computing device associated with the analysis. A second analysis of the web application may be performed. A second response may be annotated by the web application with additional coverage data based upon, at least in part, results of the second analysis. The second response may be shared with one or more users, wherein the second response may include the coverage data and the additional coverage data.

The details of one or more implementations are set forth in the accompanying drawings and the description below. Other features and advantages will become apparent from the description, the drawings, and the claims.

BRIEF DESCRIPTION OF THE DRAWINGS

FIG. 5 is an illustrative diagrammatic view of an example response with coverage data according to one or more implementations of the present disclosure.

Like reference symbols in the various drawings indicate like elements.

DETAILED DESCRIPTION OF ONE OR MORE IMPLEMENTATIONS

Figure 1:
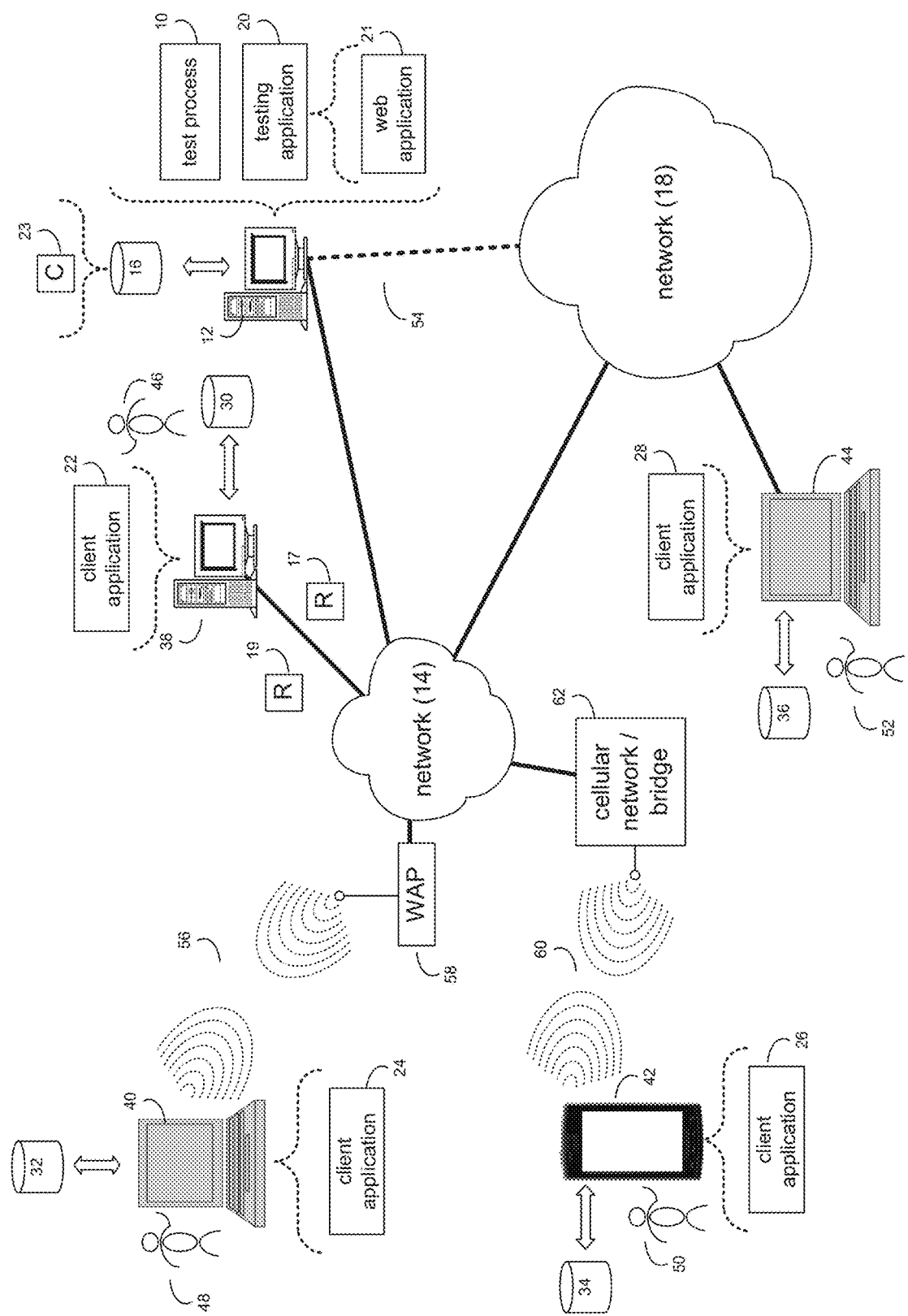
FIG. 1 is an illustrative diagrammatic view of a test process coupled to a distributed computing network according to one or more implementations of the present disclosure.

System Overview:

As will be appreciated by one skilled in the art, the present disclosure may be embodied as a method, system, or computer program product. Accordingly, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. The computer-usable, or computer-readable, storage medium (including a storage device associated with a computing device or client electronic device) may be, for example, but not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of this document, a computer-usable or computer-readable, storage medium may be any tangible medium that can contain or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

Computer program code for carrying out operations of the present disclosure may be written in an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript or PERL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider).

The flowchart and block diagrams in the figures illustrate the architecture, functionality, and operation of possible implementations of apparatus (systems), methods and computer program products according to various implementations of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function (s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring to FIG. 1, there is shown test process 10 that may reside on and may be executed by a computer (e.g., computer 12), which may be connected to a network (e.g., network 14) (e.g., the internet or a local area network). Examples of computer 12 may include, but are not limited to, a personal computer(s), a laptop computer(s), mobile computing device(s), a server computer, a series of server computers, a mainframe computer(s), or a computing cloud (s). Computer 12 may execute an operating system, for example, but not limited to Microsoft® Windows®; Mac® OS X®; Red Hat® Linux®, or a custom operating system, for example. (Microsoft and Windows are registered trademarks of Microsoft Corporation in the United States, other countries or both; Mac and OS X registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, test process 10 may perform, at a computing device, an analysis of a web application. A response (e.g., response 17) may be annotated by the web application with coverage data based upon, at least in part, results of the analysis, wherein the coverage data may indicate which actions have been performed on the web application and which actions have not been performed on the web application. The response that may include the coverage data may be shared with one or more users.

The instruction sets and subroutines of test process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, etc.) and may be located within any suitable memory location, such as storage device 16 coupled to computer 12. In some implementations, computer 12 may utilize a database management system such as, but not limited to, "My Structured Query Language" (MySQL®) in order to provide multi-user access to one or more databases, such as the above noted relational database. The data store may also be a custom database, such as, for example, a flat file database or an XML database. Any other form(s) of a data storage structure and/or organization may also be used. Test process 10 may be a component of the data store, a stand alone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute a testing application (e.g., testing application 20), examples of which may include, but are not limited to, e.g., a security testing application (e.g., security scanner application), at least a portion of an application (e.g., web application 21) to be tested, or any application that allows for the testing of applications. Those skilled in the art will appreciate that web application 21 that is to be tested via test process 10 and/or testing application 20 may be separate from, e.g., testing application 20. Test process 10 and/or testing application 20 may be accessed via client applications 22, 24, 26, 28. Test process 10 may be a stand alone application, or may be an applet/application/script that may interact with and/or be executed within testing application 20. Examples of client applications 22, 24, 26, 28 may include but are not limited to, e.g., a security testing application (e.g., security scanner application), at least a portion of an application (e.g., web application 21) to be tested, or any application that allows for the testing of applications, a standard and/or mobile web browser, an email client application, a textual and/or a graphical user interface, a customized web browser, a plugin, or a custom application. The instruction sets and subroutines of client applications 22, 24, 26, 28, which may be stored on storage devices 30, 32, 34, 36 coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, a personal computer (e.g., client electronic device 38), a laptop computer (e.g., client electronic device 40), a smart phone (e.g., client electronic device 42), a notebook computer (e.g., client electronic device 44), a tablet (not shown), a server (not shown), a scanner (e.g., security scanner) (not shown), a data-enabled, cellular telephone (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to Android™, Apple® iOS®, Mac® OS X®; Red Hat® Linux®, or a custom operating system.

One or more of client applications 22, 24, 26, 28 may be configured to effectuate some or all of the functionality of test process 10 (and vice versa). Accordingly, test process 10 may be a purely server-side application, a purely client-side application, or a hybrid server-side/client-side application that is cooperatively executed by one or more of client applications 22, 24, 26, 28 and test process 10.

One or more of client applications 22, 24, 26, 28 may be configured to effectuate some or all of the functionality of testing application 20 (and vice versa). Accordingly, testing application 20 may be a purely server-side application, a purely client-side application, or a hybrid server-side/client-side application that is cooperatively executed by one or more of client applications 22, 24, 26, 28 and testing application 20.

Users 46, 48, 50, 52 may access computer 12 and test process 10 directly through network 14 or through secondary network 18. Further, computer 12 may be connected to network 14 through secondary network 18, as illustrated with phantom link line 54. Test process 10 may include one or more user interfaces, such as browsers and textual or graphical user interfaces, through which users 46, 48, 50, 52 may access test process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows, e.g., mobile phones, computers, smart phones, and other electronic devices to be interconnected using a short-range wireless connection.

Figure 2:
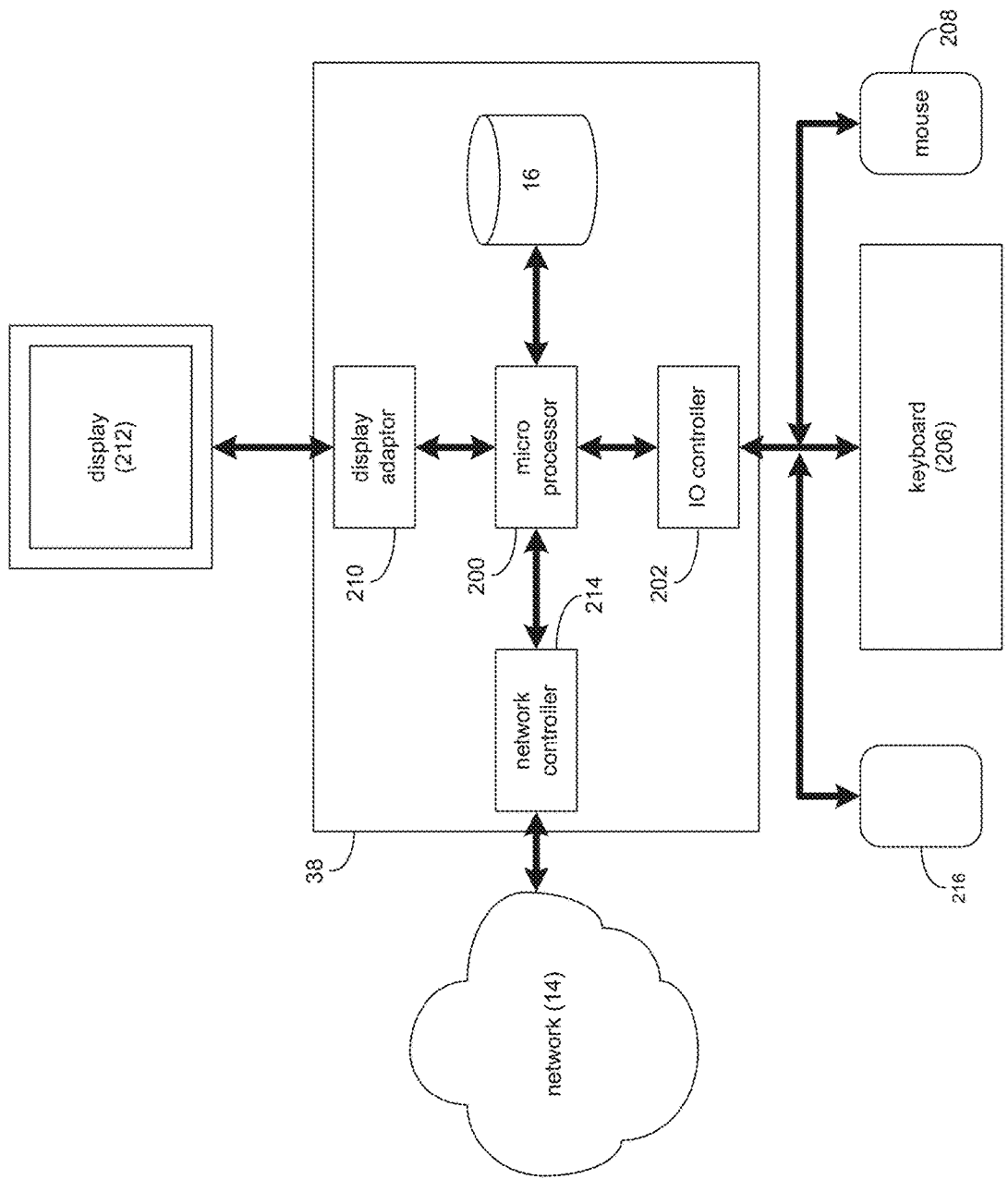
FIG. 2 is a diagrammatic view of the client electronic device of FIG. 1 according to one or more implementations of the present disclosure.
Figure 3:
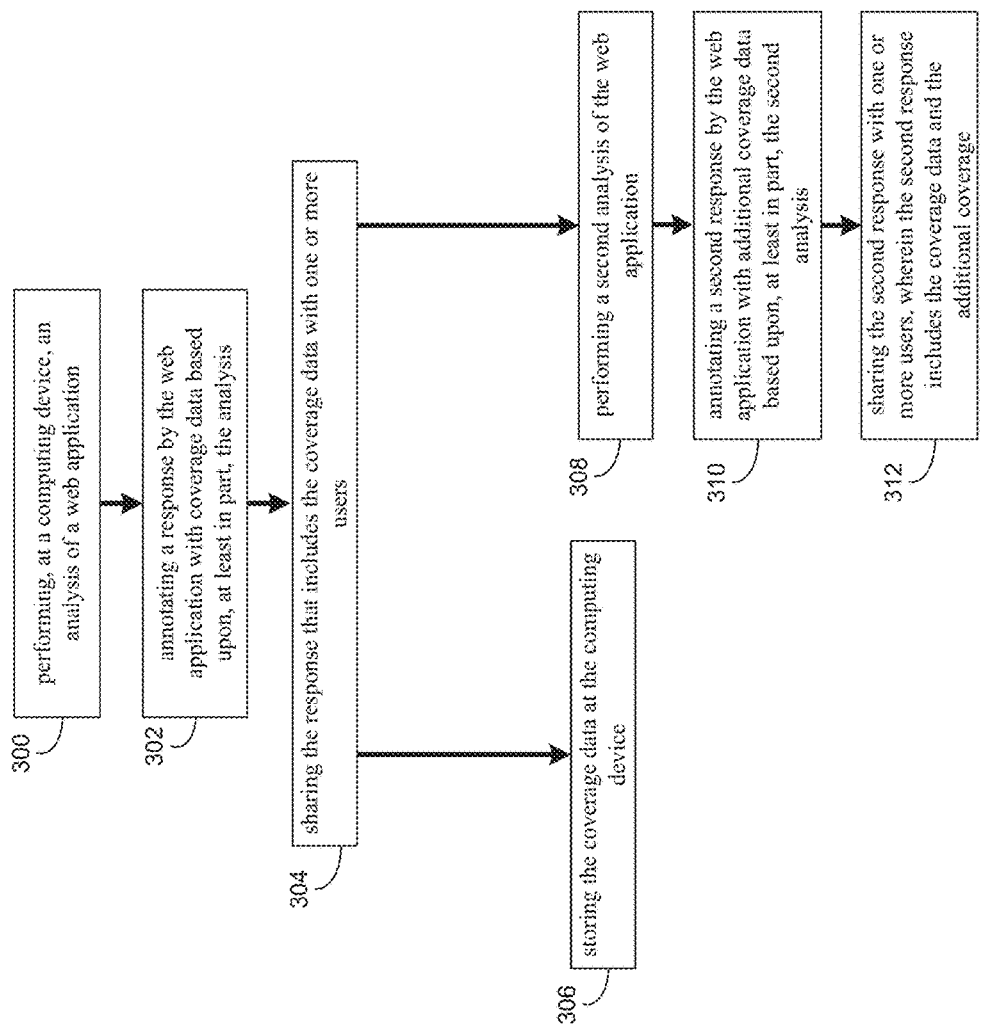
FIG. 3 is an illustrative flowchart of the test process of FIG. 1 according to one or more implementations of the present disclosure.
Figure 4:
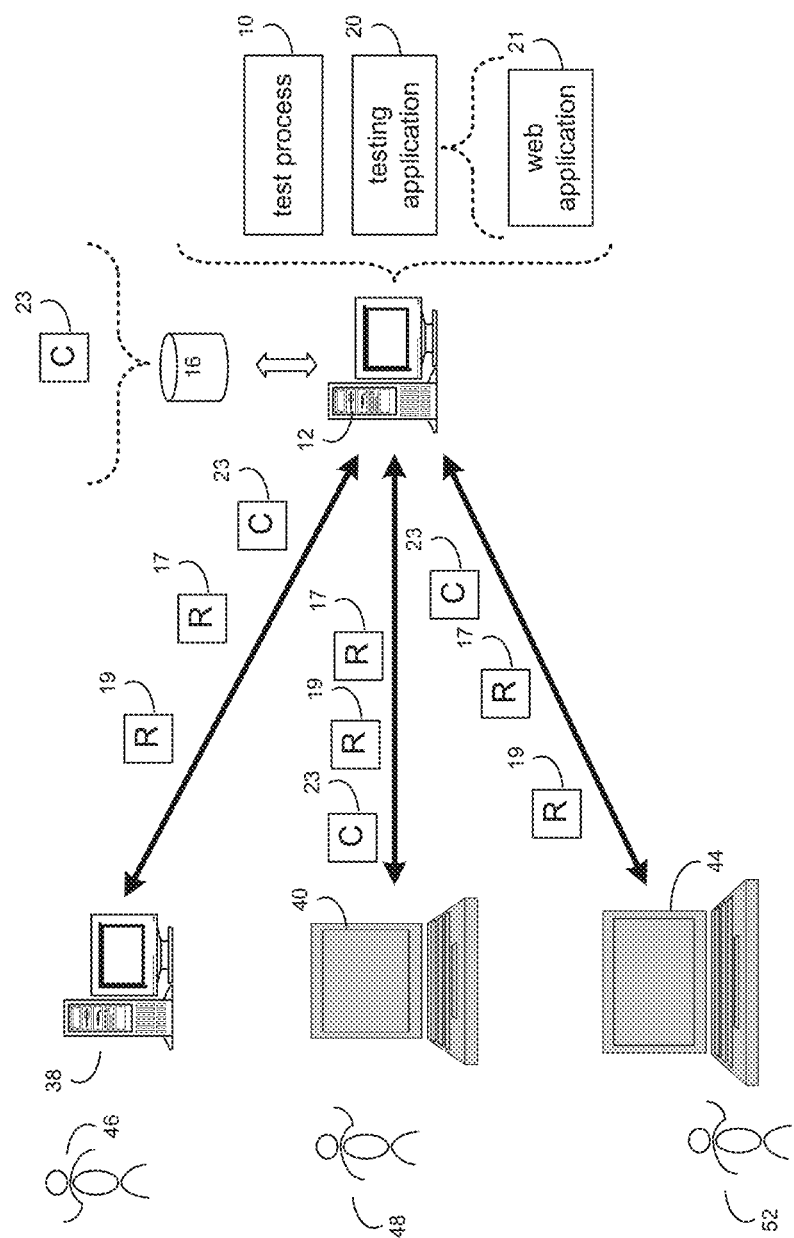
FIG. 4 is an illustrative diagrammatic view of a test process coupled to one or more users according to one or more implementations of the present disclosure.
Figure 6:
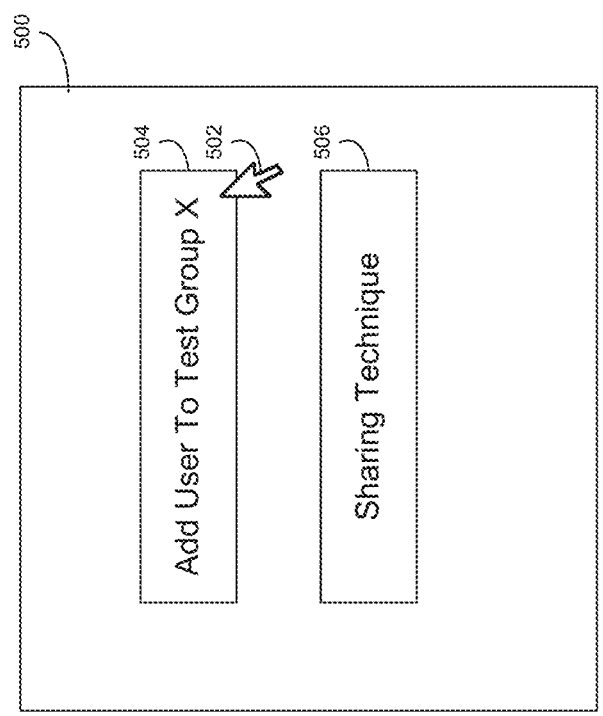
FIG. 6 is an illustrative diagrammatic view of a screen image displayed by the test process of FIG. 1 according to one or more implementations of the present disclosure.

Referring also to FIG. 2, there is shown a diagrammatic view of client electronic device 38. While client electronic device 38 is shown in this figure, this is for illustrative purposes only and is not intended to be a limitation of this disclosure, as other configuration are possible. For example, any computing device capable of executing, in whole or in part, test process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device 16. An I/O controller (e.g., I/O controller 202) may be configured to couple microprocessor 200 with various devices, such as keyboard 206, pointing/selecting device (e.g., mouse 208), custom device (e.g., scanner 216), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

The Test Process:

As discussed above and referring also to FIGS. 3-6, test process 10 may perform 300, at a computing device, an analysis of a web application. A response may be annotated 302 by the web application (e.g., via test process 10 and/or testing application 20) with coverage data based upon, at least in part, results of the analysis, wherein the coverage data may indicate which actions have been performed on the web application and which actions have not been performed on the web application. The response that may include the coverage data may be shared 304 by test process 10 with one or more users.

For instance, assume for example purposes only that a user (e.g., user 48) in California is part of a group of testers that is testing an application (e.g., web application 21) for, e.g., security vulnerabilities. One example of a potential security vulnerability to test for may include an injection attack, which may include, e.g., cross-site scripting (XSS) and command injection. In the example, user 48 may manually (e.g., via client application 24) inject a test payload into the appropriate client-side form and validate whether as a result web application 21 has transitioned into an illegal state (e.g., popping up an "Alert" message box in response to the XSS payload). Additionally/alternatively, client application 24 may automatically inject a payload into the appropriate client-side form and validate whether as a result web application 21 has transitioned into an illegal state. The determination may result from a response sent from web application 21.

Further assume in the example that another user (e.g., user 46) is a member of the group of testers in Maine that is testing web application 21 in conjunction with user 48. Understanding and quantifying the coverage data performed by user 48 may help to prevent user 46 from, for example, repeating the work previously completed by user 48 and may help to prevent user 46 from accidentally missing important tests incorrectly thought to have been completed by user 48.

Continuing with the above example and in some implementations, at a computing device (e.g., computer 12), test process 10 may, e.g., via testing application 20, perform 300 an analysis of web application 21. The analysis may include, e.g., mapping out one or more security sources and sinks in web application 21, and determining one or more potentially vulnerable flows in web application 21. Computer 12 may include a scanner configured to, at least in part, perform the analysis (e.g., via test process 10 and/or testing application 20).

In some implementations, the analysis may include static analysis (e.g., analysis performed without actually executing programs associated with web application 21). Additionally/alternatively, the analysis may include dynamic analysis (e.g., analysis performed on executing programs associated with web application 21).

A response (e.g., response 17) may be annotated 302 (e.g., embedded, appended, etc.) by web application 21 (e.g., via test process 10 and/or testing application 20) with coverage data based upon, at least in part, results of the analysis. Response 17 may include other fields in addition to those shown in FIG. 5. An example response 17 is shown at FIG. 5. The coverage data may indicate which actions have been performed on web application 21 (e.g., by user 48) and which actions have not been performed on web application 21. For example, response 17 (after the annotation) may include (e.g., visual) indications of coverage metrics, e.g., which form fields may not have yet been mutated and may potentially lead to a vulnerability; which transitions should be taken from the current form to reach a security-relevant form; which inputs should be used to trigger a security vulnerability via a particular form field, etc. In the example, response 17 may include coverage data that indicates user 48 manually injected a test payload into the appropriate client-side form and validated whether as a result web application 21 had transitioned into an illegal state. In some implementations, coverage data may include some or all interactions between one or more users (discussed below) and web application 21.

In some implementations, response 17 may include a Hypertext Markup Language (HTML) response, although other response types may also be used without departing from the scope of the disclosure. The coverage data may be stored 306 (e.g., recorded) by test process 10 (e.g., via testing application 20) at the computing device (e.g., computer 12) via storage device 16 and/or at a computing device associated with the analysis.

In some implementations, response 17 (that may include the coverage data) may be shared 304 by test process 10 with one or more users. For example, response 17 (that may include the coverage data) may be shared 304 by test process 10 with a user that did not initiate the analysis (e.g., user 46). As noted above in the example, response 17 shared 304 with user 46 may include coverage data indicating a test payload was injected into the appropriate client-side form and validated whether as a result web application 21 had transitioned into an illegal state. As such, user 46 may know, e.g., not to repeat the same test.

In some implementations, response 17 (that may include the coverage data) may be shared 304 automatically based upon, at least in part, test process 10 completing at least a portion of the analysis of web application 21. For example, one or more users may be associated by test process 10 (e.g., via client application 22) with a group of testers (e.g., test group X). In the example, after at least a portion of the analysis of web application 21 is completed, test process 10 may automatically share 304 response 17 with the coverage data to one or more users (e.g., each user) within test group X. The users may be associated with test group X, e.g., via user interface 500 of client application 22 (and/or test process 10) illustratively shown on display 212 at FIG. 6. For example, user 46 may use, e.g., curser 502 to select portion 504 of user interface 500 that enables the addition of one or more users to test group X.

In addition (or alternatively) to including the coverage data in response 17, test process 10 may share 304 response 17 (and/or only the coverage data) with the users in test group X by, e.g., retrieving the coverage data 23 (e.g., with or without response 17) from storage device 16 to be sent to one or more of the users in test group X. Response 17 (and/or only the coverage data) may also be shared 304 with the users of test group X via email or other appropriate techniques. Such techniques may similarly be selected as noted above, e.g., via curser 502 selecting portion 506 of user interface 500. In some implementations, client application 22 may (e.g., manually) request the coverage data (and/or the response with the coverage data) from test process 10. Those skilled in the art will appreciate that response 17 (and/or only the coverage data) may also be shared 304 with other users, such as managers, developers, etc., such that the entire testing procedure is guided, aggregated, and documented by test process 10.

In some implementations, a second (e.g., static or dynamic) analysis of web application 21 may be performed 308 by test process 10 (e.g., via testing application 20). The second analysis may be performed 308 in a similar manner as discussed above. A second response (e.g., response 19) may be annotated 310 by web application 21 (e.g., via test process 10 and/or testing application 20) with additional coverage data based upon, at least in part, results of the second analysis. Response 19 may be annotated 310 in a similar manner as discussed above. Response 19 may include other fields in addition to those shown in FIG. 5. Response 19 may be shared 312 with one or more users, wherein response 19 may include the coverage data and the additional coverage data. For example, response 19 may include the coverage data from response 17, and may also include the additional coverage data from response 19. Those skilled in the art will appreciate that numerous coverage data from numerous analysis and/or responses may be tracked and aggregated into a single response and/or aggregated in the above-noted data store by test process 10 to update progress of the above-noted coverage metrics.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, and combinations thereof) are possible without departing from the scope of the disclosure defined in the appended claims.

What is claimed is:

1. A computer-implemented method comprising:
  performing, at a computing device, an analysis of a web application, wherein the analysis of the web application includes automatically injecting a test payload into the web application and validating whether the web application transitions into an illegal state;
  receiving a request at the web application for the text payload;
  creating, by the web application, a response to the request;
  annotating the response to the test payload by the web application with coverage data in one or more fields of the response to the request based upon, at least in part, results of the analysis of the web application, wherein the coverage data indicates which actions have been actions performed by individual members of a collaborative group on the web application, including injection of the test payload, with the test coverage data, and which actions have not been performed on the web application, wherein the response includes one or more indications of coverage metrics, wherein the one or more indications of coverage metrics includes at least one of an indication of which client-side form has not mutated and would potentially lead to vulnerability, an indication of which web based transaction should be taken from the client-side form to reach a security-relevant form, and an indication of which input should be used to trigger a security vulnerability via a particular field of the one or more fields of the response to the request; and
sharing the response that includes the coverage data with one or more users.

2. The computer-implemented method of claim 1 wherein the response includes a Hypertext Markup Language response.

3. The computer-implemented method of claim 1 further comprising:
performing a second analysis of the web application;
annotating a second response by the web application with additional coverage data based upon, at least in part, results of the second analysis; and
sharing the second response with one or more users, wherein the second response includes the coverage data and the additional coverage data.

4. The computer-implemented method of claim 1 further comprising storing the coverage data at the computing device.

5. The computer-implemented method of claim 1 wherein the analysis includes static analysis.

6. The computer-implemented method of claim 1 wherein the response that includes the coverage data is shared with a user that did not initiate the analysis.

7. The computer-implemented method of claim 1 wherein the response that includes the coverage data is shared automatically based upon, at least in part, completing at least a portion of the analysis of the web application.

8. A computer program product residing on a non-transitory computer readable storage medium having a plurality of instructions stored thereon which, when executed by a processor, cause the processor to perform operations comprising:
performing an analysis of a web application, wherein the analysis of the web application includes automatically injecting a test payload into the web application and validating whether the web application transitions into an illegal state;
receiving a request at the web application for the text payload;
creating, by the web application, a response to the request;
annotating the response to the test payload by the web application with coverage data in one or more fields of the response to the request based upon, at least in part, results of the analysis of the web application, wherein the coverage data indicates which actions have been actions performed by individual members of a collaborative group on the web application, including injection of the test payload, with the test coverage data, and which actions have not been performed on the web application, wherein the response includes one or more indications of coverage metrics, wherein the one or more indications of coverage metrics includes at least one of an indication of which client-side form has not mutated and would potentially lead to vulnerability, an indication of which web based transaction should be taken from the client-side form to reach a security-relevant form, and an indication of which input should be used to trigger a security vulnerability via a particular field of the one or more fields of the response to the request; and
sharing the response that includes the coverage data with one or more users.

9. The computer program product of claim 8 wherein the response includes a Hypertext Markup Language response.

10. The computer program product of claim 8 wherein the operations further comprise:
performing a second analysis of the web application;
annotating a second response by the web application with additional coverage data based upon, at least in part, results of the second analysis; and
sharing the second response with one or more users, wherein the second response includes the coverage data and the additional coverage data.

11. The computer program product of claim 8 wherein the operations further comprise storing the coverage data at a computing device associated with the analysis.

12. The computer program product of claim 8 wherein the analysis includes static analysis.

13. The computer program product of claim 8 wherein the response that includes the coverage data is shared with a user that did not initiate the analysis.

14. The computer program product of claim 8 wherein the response that includes the coverage data is shared automatically based upon, at least in part, completing at least a portion of the analysis of the web application.

15. A computing system including a processor and a memory configured to perform operations comprising:
performing, at a computing device, an analysis of a web application, wherein the analysis of the web application includes automatically injecting a test payload into the web application and validating whether the web application transitions into an illegal state;
receiving a request at the web application for the text payload;
creating, by the web application, a response to the request;
annotating the response to the test payload by the web application with coverage data in one or more fields of the response to the request based upon, at least in part, results of the analysis of the web application, wherein the coverage data indicates which actions have been actions performed by individual members of a collaborative group on the web application, including injection of the test payload, with the test coverage data, and which actions have not been performed on the web application, wherein the response includes one or more indications of coverage metrics, wherein the one or more indications of coverage metrics includes at least one of an indication of which client-side form has not mutated and would potentially lead to vulnerability, an indication of which web based transaction should be taken from the client-side form to reach a security-relevant form, and an indication of which input should be used to trigger a security vulnerability via a particular field of the one or more fields of the response to the request; and
sharing the response that includes the coverage data with one or more users.

16. The computing system of claim 15 wherein the response includes a Hypertext Markup Language response.

17. The computing system of claim 15 wherein the operations further comprise:
performing a second analysis of the web application;

annotating a second response by the web application with additional coverage data based upon, at least in part, results of the second analysis; and sharing the second response with one or more users, wherein the second response includes the coverage data and the additional coverage data.

18. The computing system of claim 15 wherein the operations further comprise storing the coverage data at a computing device associated with the analysis.

19. The computing system of claim 15 wherein the analysis includes static analysis.

20. The computing system of claim 15 wherein the response that includes the coverage data is shared with a user that did not initiate the analysis.

\* \* \* \* \*